(12) United States Patent
Sylvester et al.

(10) Patent No.: US 11,566,330 B2
(45) Date of Patent: Jan. 31, 2023

(54) SYSTEMS AND METHODS FOR MAINTAINING PRETREATMENT BATHS

(71) Applicant: PPG Industries Ohio, Inc., Cleveland, OH (US)

(72) Inventors: Kevin T. Sylvester, Lawrence, PA (US); Nathan J. Silvernail, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 737 days.

(21) Appl. No.: 16/385,173

(22) Filed: Apr. 16, 2019

(65) Prior Publication Data

US 2020/0332420 A1  Oct. 22, 2020

(51) Int. Cl.
*C23C 22/80* (2006.01)
*B32B 15/01* (2006.01)
*C23C 22/05* (2006.01)

(52) U.S. Cl.
CPC ............ *C23C 22/80* (2013.01); *B32B 15/013* (2013.01); *C23C 22/05* (2013.01)

(58) Field of Classification Search
CPC ................................ C23C 22/80; C23C 22/05
See application file for complete search history.

(56) References Cited

U.S. PATENT DOCUMENTS

| | | | |
|---|---|---|---|
| 2,087,352 A | | 7/1937 | Mitchell et al. |
| 2,220,966 A | * | 11/1940 | Krchm .................. C09C 1/3692 516/194 |
| 3,218,201 A | * | 11/1965 | Otto ........................ C23C 22/46 148/252 |
| 3,912,548 A | | 10/1975 | Faigen |
| 5,328,525 A | | 7/1994 | Musingo et al. |
| 5,449,415 A | | 9/1995 | Dolan |
| 5,653,823 A | | 8/1997 | McMillen et al. |
| 5,662,746 A | | 9/1997 | Affinito |
| 10,113,070 B2 | * | 10/2018 | Kolcun .................... C23C 22/34 |
| 2018/0043393 A1 | * | 2/2018 | Sylvester ............ C25D 11/246 |

FOREIGN PATENT DOCUMENTS

| | | |
|---|---|---|
| JP | 2003290785 A | 10/2003 |
| RU | 2518819 C2 | 6/2014 |
| RU | 2653028 C2 | 5/2018 |
| WO | 95/33869 | 12/1995 |
| WO | 2005026047 | 3/2005 |
| WO | 2005026047 A1 | 3/2005 |

OTHER PUBLICATIONS

Granger, Julie et al., "Removal of nitrite with sulfamic acid for nitrate N and O isotope analysis with the denitrifier method"; Rapid Communications in Mass Spectrometry; Dec. 15, 2009; pp. 3753-3762; 2009, 23; John Wiley & Sons, Ltd.

Light et al., "Determination of Fluoride in Toothpaste Using an Ion-Selective Electrode", Journal of Chemical Education, vol. 52, No. 4, Apr. 1975, pp. 247-250.

* cited by examiner

*Primary Examiner* — Hai Y Zhang
(74) *Attorney, Agent, or Firm* — Alicia M. Passerin

(57) ABSTRACT

Disclosed is a system for maintaining a pretreatment bath containing a pretreatment comprising a Group IVB metal. The system comprises an aqueous reducing agent comprising a metal cation and a latent source of sulfate which, upon reaction with a contaminant in the pretreatment bath, forms a metal sulfate. The contaminant comprises a nitrite source. The metal sulfate salt has a pKsp of 4.5 to 11 at a temperature of 25° C. Also disclosed is a method for maintaining a pretreatment bath containing a pretreatment composition comprising a Group IVB metal. The method comprises supplying the reducing agent to the pretreatment bath in an amount sufficient to reduce a pollution ratio of the pretreatment bath to less than 1:1. Also disclosed are substrates with a pretreatment bath maintained according to the system and method.

11 Claims, No Drawings

SYSTEMS AND METHODS FOR MAINTAINING PRETREATMENT BATHS

BACKGROUND

The use of protective coatings on metal surfaces for improved corrosion and paint adhesion is common. Conventional techniques for coating such substrates include techniques that involve pretreating the metal substrate with a phosphate conversion coating and chrome-containing rinses. The use of such phosphate and/or chromate-containing compositions, however, imparts environmental and health concerns. As a result, pretreatment compositions have been developed that are either free of chromate and/or phosphate, or that include phosphate at levels that are low enough to avoid the environmental and health concerns raised by conventional coating techniques. Such compositions are generally based on chemical mixtures that react with the substrate surface and bind to it to form a protective layer. For example, pretreatment compositions based on a Group IVB metal compound have recently become more prevalent.

SUMMARY

Disclosed herein, according to the present invention, is a system for maintaining a pretreatment bath, the system comprising an aqueous reducing agent comprising a metal cation and a latent source of sulfate which, upon reaction with a contaminant in the pretreatment bath, forms a metal sulfate; wherein the contaminant comprises a source of nitrite; and wherein the metal sulfate salt has a pKsp of 4.5 to 11 at a temperature of 25° C.

Also disclosed is a method for maintaining a pretreatment bath containing a pretreatment composition comprising a Group IVB metal, the method comprising supplying an aqueous reducing agent to the pretreatment bath in an amount sufficient to reduce a pollution ratio of the pretreatment bath to less than 1:1; wherein the reducing agent comprises a metal cation and a latent source of sulfate which, upon reaction with a contaminant in the pretreatment bath, forms a metal sulfate; wherein the contaminant comprises a source of nitrite; and wherein the metal sulfate salt has a pKsp of 4.5 to 11 at a temperature of 25° C.

Also disclosed are substrates treated with a pretreatment bath maintained by the system or method of the present invention, wherein a film formed on a surface of the substrate has at least a 33% increase in zirconium weight % compared to a film formed on a surface of a substrate treated with a pretreatment bath not maintained by the system or method of the present invention or by any system or method of maintenance as measured by X-ray fluorescence.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" reducing agent and "a" Group IVB metal, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed and/or unrecited elements, materials, ingredients and/or method steps. As used herein, "consisting of" is understood in the context of this application to exclude the presence of any unspecified element, ingredient and/or method step. As used herein, "consisting essentially of" is understood in the context of this application to include the specified elements, materials, ingredients and/or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, and/or provided on but not necessarily in contact with the surface. For example, a coating layer "formed over" a substrate does not preclude the presence of one or more other intervening coating layers of the same or different composition located between the formed coating layer and the substrate.

Unless otherwise disclosed herein, the term "substantially free," when used with respect to the absence of a particular material, means that such material, if present at all in a composition, a bath containing the composition, and/or layers formed from and comprising the composition, only is present in a trace amount of 5 ppm or less based on a total weight of the composition, bath and/or layer(s), as the case may be. Unless otherwise disclosed herein, the term "essentially free," when used with respect to the absence of a particular material, means that such material, if present at all in a composition, a bath containing the composition, and/or layers formed from the composition, only is present in a trace amount of 1 ppm or less based on a total weight of the composition, bath and/or layer(s), as the case may be. Unless otherwise disclosed herein, the term "completely free," when used with respect to the absence of a particular material, means that such material, if present at all in a composition, a bath containing the composition, and/or layers formed from the composition, is absent from the composition, the bath containing the composition, and/or layers formed from same (i.e., the composition, bath containing the composition, and/or layers formed from the composition contain 0 ppm of such material). When a composition, bath containing a composition, and/or a layer(s) formed from the same is substantially free, essentially free, or completely free of a particular material, this means that such material is excluded therefrom, except that the material may be present as a result of, for example, carry-over from prior treatment baths in the processing line, municipal water sources, substrate(s), and/or dissolution of equipment.

As used herein, a "salt" refers to an ionic compound made up of metal cations and non-metallic monoatomic or polyatomic anions and having an overall electrical charge of zero. Salts may be hydrated or anhydrous.

As used herein, an "aqueous composition" refers to a solution or dispersion in a medium that comprises predominantly water. For example, the aqueous medium may comprise water in an amount of more than 50 wt. %, or more than 70 wt. %, or more than 80 wt. %, or more than 90 wt. %, or more than 95 wt. %, based on the total weight of the medium. The aqueous medium may, for example, consist substantially of water.

"Nitrite" or "$NO_2$" or "nitrite ion" or "nitrite anion," as used herein, refers to the total amount of nitrite (bound and free, including nitrite electrostatically adhered or bound to a metal surface) in the pretreatment bath that results from the reduction of nitrate ($NO_3^-$) to $NO_2$ by contact with the metal substrate.

As used herein, the term "Group IA metal" refers to an element that is in Group IA of the CAS version of the Periodic Table of the Elements as is shown, for example, in the Handbook of Chemistry and Physics, $63^{rd}$ edition (1983), corresponding to Group 1 in the actual IUPAC numbering.

As used herein, the term "Group IA metal compound" refers to compounds that include at least one element that is in Group IA of the CAS version of the Periodic Table of the Elements.

As used herein, the term "Group IIA metal" refers to an element that is in Group IIA of the CAS version of the Periodic Table of the Elements as is shown, for example, in the Handbook of Chemistry and Physics, $63^{rd}$ edition (1983), corresponding to Group 2 in the actual IUPAC numbering.

As used herein, the term "Group IIA metal compound" refers to compounds that include at least one element that is in Group IIA of the CAS version of the Periodic Table of the Elements.

As used herein, the term "Group IVB metal" refers to an element that is in group IVB of the CAS version of the Periodic Table of the Elements as is shown, for example, in the Handbook of Chemistry and Physics, $63^{rd}$ edition (1983), corresponding to Group 4 in the actual IUPAC numbering.

As used herein, the term "Group IVB metal compound" refers to compounds that include at least one element that is in Group IVB of the CAS version of the Periodic Table of the Elements.

As used herein, the term "Group IVA metal" refers to an element that is in group IVA of the CAS version of the Periodic Table of the Elements as is shown, for example, in the Handbook of Chemistry and Physics, $63^{rd}$ edition (1983), corresponding to Group 14 in the actual IUPAC numbering. An example from Group IVA includes lead(II).

As used herein, the term "Group IV metal compound" refers to compounds that include at least one element that is in Group IVA of the CAS version of the Periodic Table of the Elements. An example of a Group IVA compound includes lead(II) sulfate.

As used herein, the term "Group IB metal" refers to an element that is in group IB of the CAS version of the Periodic Table of the Elements as is shown, for example, in the Handbook of Chemistry and Physics, $63^{rd}$ edition (1983), corresponding to Group 11 in the actual IUPAC numbering. An example of a Group IB metal is silver.

As used herein, the term "Group IB metal compound" refers to compounds that include at least one element that is in Group IB of the CAS version of the Periodic Table of the Elements. An example of a Group IB compound is silver(I) sulfate.

As used herein, a "pretreatment composition" refers to a composition, e.g., a solution or dispersion, that is capable of reacting with and chemically altering a substrate surface and binding thereto to form a film that affords corrosion protection.

As used herein, a "pretreatment bath" refers to an aqueous bath formed from a pretreatment composition (as either a concentrate or dilute composition) comprising a Group IVB metal.

As used herein, a "fresh" pretreatment bath refers to a pretreatment bath that has not be exposed to articles to be treated thereby.

As used herein, a "spent" pretreatment bath refers to a pretreatment bath that has been exposed to articles to be treated thereby. A "spent" pretreatment bath can be artificially produced (such as in the Examples) by the addition of known contaminants that build in a bath as a result of the pretreatment process. For example, nitrite and zinc are often by products that build up in a pretreatment bath during part processing. Sodium nitrite could be used to supply the former contaminants and soluble zinc salts, such as zinc chloride, could be used to supply the latter contaminant.

As used herein, "on-shift" means that an article to be treated with the pretreatment composition is present in the pretreatment bath.

As used herein, "off-shift" means that an article to be treated by the pretreatment composition is absent from the pretreatment bath but does not mean that the pretreatment bath is necessarily removed from the process line.

As used herein, the term "pollution ratio" refers to the millimolar ratio of nitrite to zirconium in a pretreatment bath based on total volume of the pretreatment composition. As the magnitude of the pollution ratio increases, the millimolar concentration of nitrite (contaminant) in the pretreatment bath increases.

Unless otherwise disclosed herein, as used herein, the terms "total composition weight", "total bath weight", "total weight of a composition", "total weight of a treatment bath" or similar terms refer to the total weight of all ingredients being present in the respective composition or bath including any carriers and solvents.

According to the present invention, the pretreatment bath contains a pretreatment composition that may be used to pretreat metal substrates, such as those that are often used in the assembly of automotive bodies, automotive parts, and other articles, such as small metal parts, including fasteners, i.e., nuts, bolts, screws, pins, nails, clips, buttons, and the like. Specific examples of suitable metal substrates include, but are not limited to, cold rolled steel, hot rolled steel, steel coated with zinc metal, zinc compounds, or zinc alloys, such as electrogalvanized steel, hot-dipped galvanized steel, galvanealed steel, and steel plated with zinc alloy. Also, aluminum alloys, aluminum plated steel and aluminum alloy plated steel substrates may be used. Other suitable non-ferrous metals include copper and magnesium, as well as alloys of these materials. According to the present invention, the metal substrate being treated by the pretreatment composition may be a cut edge of a substrate that is otherwise treated and/or coated over the rest of its surface. According to the present invention, the metal substrate may be in the form of, for example, a sheet of metal or a fabricated part.

Introduction of reduced metals, metal oxides, or metal salts is a common method of supplying metals to pretreatment baths containing a pretreatment composition, including, for example, the addition of metal nitrates. Since all nitrates are water soluble, these species provide the most facile way to supply metal cations to aqueous pretreatment compositions. For example, electropositive metals, such as copper or nickel, are routinely added as the nitrate salts to Group IVB pretreatment compositions. However, under the acidic pretreatment conditions, nitrate can be reduced to the nitrite ($NO_2^{1-}$) or nitrous acid ($HNO_2$). This reduction spontaneously occurs in the presence of substrate, e.g., steel, since the $E^*_{cell}$ is positive. As the concentration of nitrite increases, this species may react with the substrate surface, causing mixed iron oxides to form on the surface of the substrate, which can interfere with deposition of pretreatment compositions onto steel substrates, thereby interfering with corrosion protection of such substrates. The aforementioned mixture of iron oxides that may form on the steel substrate surface may be inferior relative to the film formed by Group IVB-containing pretreatment compositions.

TABLE 1

Redox Reactions

| Redox Couple | Reduction half-cell reaction | Half-Cell Potential (V) | $E^*_{cell}$ with steel substrate (1) |
|---|---|---|---|
| $NO_3^{1-}/HNO_2$ | $NO_3^{1-} + 3H^+ + 2e \rightarrow HNO_2 + H_2O$ | +0.94 | 1.39 |
| $HNO_2/NO$ | $HNO_2 + H^+ + e \rightarrow NO + H_2O$ | +0.983 | 1.43 |

(1) $E^*_{cell}$ was calculated using the conversion of iron(0) to iron(II) as the oxidation half-cell reaction, which has a value of +0.45 V.

Disclosed herein, according to the present invention, is a system for maintaining a pretreatment bath containing a pretreatment composition comprising, or consisting essentially of, or consisting of, a Group IVB metal. According to the present invention, the system may comprise, or consist essentially of, or consist of, an aqueous reducing agent comprising a metal cation and a latent source of sulfate which, upon reaction with a contaminant in the pretreatment bath, forms a metal sulfate salt; wherein the contaminant comprises a nitrite source; and wherein the metal sulfate salt has a pKsp of 4.5 to 11 at a temperature of 25° C. According to the present invention, the method for maintaining a pretreatment bath containing a pretreatment composition comprising, consisting essentially of, or consisting of, a Group IVB metal may comprise, or consist essentially of, or consist of, supplying an aqueous reducing agent to the pretreatment bath in an amount sufficient to reduce a pollution ratio of the pretreatment bath to less than 1:1; wherein the reducing agent comprises a metal cation and a latent source of sulfate which, upon reaction with a contaminant in the pretreatment bath, forms a metal sulfate; wherein the contaminant comprises a nitrite source; and wherein the metal sulfate salt has a pKsp of 4.5 to 11 at a temperature of 25° C.

Examples of suitable metal sulfates (which are the reaction product of the reducing agent and the contaminant) useful in the present invention and their corresponding pKsp are shown in Table 3, below. As used herein, "maintaining" a pretreatment bath refers to keeping certain parameters of the pretreatment bath, including the concentration of certain ingredients, the relative concentration of certain ingredients (such as may be defined by the ratio of the concentration of one ingredient to another in the pretreatment bath), and/or the pH of the pretreatment bath in desirable ranges. This can be achieved, as described in more detail below, by the addition of the reducing agent to the treatment bath on-shift and/or off-shift. The reducing agent described herein may be supplied to a spent pretreatment bath containing a pretreatment composition in order to chemically control nitrite levels therein, such as, for example, by reducing the oxidation state of nitrogen in nitrite (that forms during treatment of substrates). Examples of nitrogen compounds with an oxidation state lower than nitrite include, $N_2$, NO, $N_2O$, $NH_3$, or the like. Accordingly, as mentioned above, the methods of the present invention may comprise, or consist of, or consist essentially of, supplying the reducing agent to the pretreatment bath. In other words, the reducing agent may react with the nitrite present in the spent pretreatment bath such that the oxidation state of the nitrogen in the nitrite is reduced from +3. The oxidation state of various nitrogen compounds is shown in Table 2.

TABLE 2

Oxidation State of Nitrogen in Select Nitrogen Compounds

| Compound Name | Molecular Formula | Nitrogen Oxidation State |
|---|---|---|
| Ammonia | $NH_3$ | −3 |
| Hydrazine | $N_2H_4$ | −2 |
| Elemental Nitrogen | $N_2$ | 0 |
| Nitrous Oxide | $N_2O$ | +1 |
| Nitric Oxide | NO | +2 |
| Nitrous Acid or Nitrite | $HNO_2$ or $NO_2^{1-}$ | +3 |
| Nitrogen Dioxide | $NO_2$ | +4 |
| Nitric Acid or Nitrate | $HNO_3$ or $NO_3^{1-}$ | +5 |

TABLE 3 pKsp values of suitable metal sulfates

| Metal Sulfate | Ksp | pKsp |
|---|---|---|
| Calcium Sulfate | $2.5 \times 10^{-5}$ | 4.62 |
| Strontium Sulfate | $3.2 \times 10^{-7}$ | 6.50 |
| Barium Sulfate | $1.1 \times 10^{-10}$ | 9.96 |
| Radium Sulfate | $4.3 \times 10^{-11}$ | 10.37 |
| Lead(II) Sulfate | $6.3 \times 10^{-7}$ | 6.20 |
| Silver(I) Sulfate | $1.5 \times 10^{-5}$ | 4.83 |

According to the present invention, the systems and methods of the present invention may comprise (i) adding materials to the pretreatment bath formed from the pretreatment composition that are different from materials used to formulate the pretreatment composition and optionally (ii) adding materials to the pretreatment bath formed from the pretreatment composition that are the same as those materials used to formulate the pretreatment composition. For example, while the method of maintaining the pretreatment bath containing the pretreatment composition may comprise adding the reducing agent described herein to the pretreatment bath, the pretreatment composition may be formulated using a Group IVB metal. Thus, the systems and methods of the present invention are not directed to simply adding more pretreatment composition to the pretreatment bath in order to maintain the bath. Rather, as mentioned above, the systems and methods of the present invention are directed to supplying the reducing agent to the pretreatment bath in an amount sufficient to decrease a pollution ratio of the pretreatment bath to less than 1:1 parts by millimoles based on total volume of the bath. Optionally, the systems and methods of the present invention may further comprise supplying to the pretreatment bath materials that are the same as materials used to formulate the pretreatment composition. For example, and as described in more detail below, the pretreatment composition may be formulated using a Group IVB metal, and the system of maintaining the bath may further comprise adding to the pretreatment bath a composition comprising a Group IVB metal, such as in an amount sufficient to replenish the amounts of ingredients in a spent pretreatment bath to at least 80% of the amounts present in a fresh pretreatment bath (as described below) based on total weight of the pretreatment composition, such as at least 90%, such as at least 95%, such as at least 97%. Prior to the supplying the reducing agent, the pollution ratio in the pretreatment bath may be at least 1:1 parts by millimoles based on total volume of the bath.

The reducing agent may comprise a metal cation which, upon reaction with a contaminant such as nitrite in the pretreatment bath, forms a metal sulfate salt. The metal sulfate salt may have a pKsp of 4.5 to 11 at a temperature of 25° C. Suitable examples of metals useful in the reducing agent include alkaline earth metals such as calcium, barium, strontium, radium, and combinations thereof, post-transition metals such as lead, and/or transition metals such as silver, and combinations thereof. For example, the reducing agent may comprise barium sulfamate. The reducing agent may comprise a latent source of sulfate which may be formed or released upon reaction of the reducing agent with the contaminant (i.e., nitrite) in the pretreatment bath. Examples of latent sources of sulfate include sulfamic acid and sulfamate salts. For example, sulfamic acid and sulfamate salts can release sulfate in the form of sulfuric acid or hydrogen sulfate upon reaction with nitrous acid or nitrite anion:

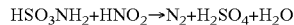

$HSO_3NH_2 + HNO_2 \rightarrow N_2 + H_2SO_4 + H_2O$

Other non-limiting examples of latent sources of sulfate include acids and metal salts of sulfite ($SO_3^{2-}$), bisulfite ($HSO_3^{1-}$), thiosulfate ($S_2O_3^{2-}$), dithionate ($S_2O_6^{2-}$), dithionite ($S_2O_4^{2-}$). In such examples, sulfate may be released from these chemical species by oxidation of sulfur by the action of the contaminant (i.e.: nitrite). For example, sulfur present in sulfurous acid ($H_2SO_3$) is in the 4+ oxidation state and when exposed to the nitrite can form sulfate, which has sulfur present in the 6+ oxidation state.

The reducing agent may be prepared by the addition of a discrete metal salt, such as barium sulfamate. Alternatively, the reducing agent may be prepared by the addition of a soluble form of the metal cation and a separate latent source of sulfate. For example, the reducing agent comprised of barium sulfamate can be prepared by the addition of a mixture of barium hydroxide and sulfamic acid in a carrier such as water. In such an example, the barium sulfamate provides a soluble source of barium and the sulfamic acid provides the latent source of sulfate. When this mixture comes in contact with the contaminant (i.e., nitrite) after addition to the pretreatment composition, barium sulfate precipitates and nitrogen gas evolves as described above.

The reducing agent may further comprise additional metals, which may be present in reducing agent in the form of a salt, such as, for example, a hydroxide, a sulfamate, a carbonate, a halide, a sulfate, a phosphate, a silicate (e.g., orthosilicate or metasilicate), or combinations thereof. For example, the reducing agent may further comprise ascorbic acid, sulfanilic acid, titanium (III) chloride, tin (II) chloride, or combinations thereof.

According to the present invention, the metal which forms a sulfate salt may have a pKsp of at least 4.5 at 25° C., such as at least 5.5, such as at least 6.0, such as at least 6.5 and may have a pKsp of no more than 11 at 25° C., such as no more than 10.5, such as no more than 10.25, such as no more than 10.0. According to the present invention, the metal which forms a sulfate salt may have a pKsp of 4.5 to 11 at 25° C., such as 5.5 to 10.5, such as 6.0 to 10.25, such as 6.25 to 10.0.

The reducing agent generally comprises an aqueous medium as a carrier. The reducing agent thus may be in the form of an aqueous solution and/or a dispersion of the metal or metal cation which forms a sulfate salt in the carrier. For example, the reducing agent may further comprise water and, in some instances, water may be used to dilute the reducing agent. Any appropriate amount of water may be present in the reducing agent to provide the desired concentration of other ingredients.

According to the present invention, the reducing agent may be prepared by combining the metal which forms a sulfate salt and water to form a first preblend. The ingredients of the first preblend may be agitated under mild agitation once the ingredients are combined with one another. The reducing agent may be prepared at ambient conditions, such as approximately 70° F. to 80° F. (21 to 26° C.), or at temperatures slightly below and/or slightly above ambient conditions, such as from approximately 50° F. to 140° F. (10° C. to 60° C.), such as 60° F. to 105° F. (16° C. to 41° C.).

The pH of the reducing agent may be adjusted to any desired value prior to supplying the reducing agent to the spent pretreatment bath using, for example, any acid or base as is necessary. According the present invention, the pH of the reducing agent may be adjusted to, for example, less than 7, such as less than 5, such as less than 3, and may be adjusted by the inclusion of an acidic material, including water dispersible acids, such as sulfuric acid, sulfamic acid, hydrohalic acids, fluorozirconic acid, fluorotitanic acid, hydrofluoric acid, alkylsulfonic acid, organic carboxylic acids such as formic acid or acetic acid, perchloric acid, or combinations thereof. According to the present invention, the pH of the composition may be adjusted by the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

According to the present invention, the reducing agent may be added to the pretreatment bath in an amount sufficient to reduce the pollution ratio to less than 1.0:1.0, such as less than 0.75:1.0, such as less than 0.5:1.0, such as less than 0.3:1.0.

According to the present invention, the method of maintaining a treatment bath may further comprise adjusting a pH of the treatment bath, such as by adding any acid and/or base as is necessary. According to the present invention, the treatment bath may be maintained through the inclusion of an acidic material, including water soluble and/or water dispersible acids, such as nitric acid, sulfuric acid, and/or phosphoric acid. According to the present invention, the pH of the treatment bath may be maintained through the inclusion of a basic material, including water soluble and/or water dispersible bases, such as Group I carbonates, Group II carbonates, hydroxides, such as sodium hydroxide, potassium hydroxide, lithium hydroxide, ammonium hydroxide, ammonia, amines such as triethylamine, methylethyl amine, or mixtures thereof.

The method of maintaining a treatment bath of the present invention may further comprise monitoring the pH of the treatment bath using a pH meter and probe appropriate for the size of the bath containing the pretreatment composition. An example of a suitable pH meter and probe includes, but is not limited to, the Accumet AB15 (available from Fisher Scientific) and a single junction electrode (Ag/AgCl reference; Fisher Scientific).

According to the present invention, the pretreatment composition used to prepare the pretreatment bath may comprise, or may consist of, or may consist essentially of, a Group IVB metal. According to the present invention, the pretreatment composition and the fresh pretreatment bath may be substantially free, or may be completely free, of nitrite.

Optionally, according to the present invention, the method may further comprise the step of adjusting the pH of the pretreatment bath to a pH of less than 7, such as a pH of less than 5, such as a pH of less than 3, prior to the step of supplying the reducing agent to the pretreatment bath, by adding any of the acidic materials described above. The methods disclosed herein optionally may further comprise adjusting the pH of the pretreatment bath following supplying the reducing agent to the bath. The pH of the pretreatment bath may be adjusted to be within a standard operating range for the pretreatment composition, such as from 2 to 6.5, such as from 3.0 to 6.0, such as from 4 to 5.5. The pH of the pretreatment bath may be adjusted using, for example, any acid or base as is necessary. For example, the pH of the solution may be maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

As mentioned above, in examples, the methods disclosed herein are directed towards supplying a reducing agent to a spent pretreatment bath in order to control the nitrite levels in the spent pretreatment bath. As described above, the pretreatment bath may contain a pretreatment composition. According to the present invention, the reducing agent may be added to the pretreatment bath when the bath is on-shift or off-shift.

As substrate is treated in the pretreatment bath, the pollution ratio is likely to increase, such that the pollution ratio of the pretreatment bath may be 1.0:1.0 or greater, such as such as 2.0:1.0, such as 5.0:1.0, such as 10.0:1.0, such as 100.0:1.0, such as 500.0:1.0. According to the present invention, the reducing agent may be added to the pretreatment bath to reduce to reduce the pollution ratio of the pretreatment bath to less than 1.0:1.0, such as less than 0.75:1.0, such as less than 0.5:1.0, such as less than 0.3:1.0. For example, the reducing agent may be added to the pretreatment bath in an amount sufficient that the pretreatment bath is substantially free, or completely free, of nitrite.

The reducing agent may be added to the pretreatment bath under agitation or without agitation followed by agitation of the materials. The reducing agent may be added to the pretreatment bath when the pretreatment bath is at ambient temperature, such as approximately 70° F. to 80° F. (21° C. to 26° C.), as well as when the pretreatment bath is at temperatures slightly below and/or slightly above ambient temperature, such as, for example, from approximately 50° F. to 140° F. (10° C. to 60° C.), such as 60° F. to 105° F. (16° C. to 41° C.).

As discussed above, the pretreatment composition may comprise a Group IVB metal. The Group IVB metal may comprise zirconium, titanium, hafnium, or combinations thereof. For example, zirconium, titanium, hafnium, or a mixture thereof may be used in the pretreatment composition. Suitable compounds of zirconium include, but are not limited to, hexafluorozirconic acid, alkali metal and ammonium salts thereof, ammonium zirconium carbonate, zirconyl nitrate, zirconyl sulfate, zirconium carboxylates and zirconium hydroxy carboxylates, such as zirconium acetate, zirconium oxalate, ammonium zirconium glycolate, ammonium zirconium lactate, ammonium zirconium citrate, zirconium basic carbonate, and mixtures thereof. Suitable compounds of titanium include, but are not limited to, fluorotitanic acid and its salts. A suitable compound of hafnium includes, but is not limited to, hafnium nitrate.

According to the present invention, the Group IVB metal may be present in the pretreatment composition in a total amount of at least 20 ppm metal (calculated as metal), based on total weight of the pretreatment composition, such as at least 50 ppm metal, or, in some cases, at least 70 ppm metal. According to the present invention, the Group IVB metal may be present in the pretreatment composition in a total amount of no more than 1000 ppm metal (calculated as metal), based on total weight of the pretreatment composition, such as no more than 600 ppm metal, or, in some cases, no more than 300 ppm metal. According to the present invention, the Group IVB metal may be present in the pretreatment composition in a total amount of 20 ppm metal to 1000 ppm metal (calculated as metal), based on total weight of the pretreatment composition, such as from 50 ppm metal to 600 ppm metal, such as from 70 ppm metal to 300 ppm metal. As used herein, the term "total amount," when used with respect to the amount of Group IVB metal, means the sum of all Group IVB metals present in the pretreatment composition.

According to the present invention, the pretreatment composition may further comprise an anion that may be suitable for forming a salt with the cations of the Group IVB metal, such as a halogen, a sulfate, a silicate (orthosilicates and metasilicates), carbonates, hydroxides, and the like. According to the present invention, the pretreatment composition also may comprise an electropositive metal ion. As used herein, the term "electropositive metal ion" refers to metal ions that will be reduced by the metal substrate being treated when the pretreatment solution contacts the surface of the metallic substrate. As will be appreciated by one skilled in the art, the tendency of chemical species to be reduced is called the reduction potential, is expressed in volts, and is measured relative to the standard hydrogen electrode, which is arbitrarily assigned a reduction potential of zero. The reduction potential for several elements is set forth in Table 4 below (according to the CRC $82^{nd}$ Edition, 2001-2002). An element or ion is more easily reduced than another element or ion if it has a voltage value, E*, in the following table, that is more positive than the elements or ions to which it is being compared.

TABLE 4

Reduction Potentials

| Element | Reduction half-cell reaction | Voltage, E* |
|---|---|---|
| Potassium | $K^+ + e \rightarrow K$ | −2.93 |
| Calcium | $Ca^{2+} + 2e \rightarrow Ca$ | −2.87 |
| Sodium | $Na^+ + e \rightarrow Na$ | −2.71 |
| Magnesium | $Mg^{2+} + 2e \rightarrow Mg$ | −2.37 |
| Aluminum | $Al^{3+} + 3e \rightarrow Al$ | −1.66 |
| Zinc | $Zn^{2+} + 2e \rightarrow Zn$ | −0.76 |
| Iron | $Fe^{2+} + 2e \rightarrow Fe$ | −0.45 |
| Nickel | $Ni^{2+} + 2e \rightarrow Ni$ | −0.26 |
| Tin | $Sn^{2+} + 2e \rightarrow Sn$ | −0.14 |
| Lead | $Pb^{2+} + 2e \rightarrow Pb$ | −0.13 |
| Hydrogen | $2H^+ + 2e \rightarrow H_2$ | −0.00 |
| Copper | $Cu^{2+} + 2e \rightarrow Cu$ | 0.34 |
| Mercury | $Hg_2^{2+} + 2e \rightarrow 2Hg$ | 0.80 |
| Silver | $Ag^+ + e \rightarrow Ag$ | 0.80 |
| Gold | $Au^{3+} + 3e \rightarrow Au$ | 1.50 |

Thus, as will be apparent, when the metal substrate comprises one of the materials listed earlier, such as cold rolled steel, hot rolled steel, steel coated with zinc metal, zinc compounds, or zinc alloys, hot-dipped galvanized steel, galvanealed steel, steel plated with zinc alloy, aluminum alloys, aluminum plated steel, aluminum alloy plated steel, magnesium and magnesium alloys, suitable electropositive metal ions for deposition thereon include, for example, nickel, copper, silver, and gold, as well mixtures thereof.

According to the present invention, when the electropositive metal ion comprises copper, both soluble and insoluble compounds may serve as a source of copper ions in the pretreatment compositions. For example, the supplying source of copper ions in the pretreatment composition may be a water-soluble copper compound. Specific examples of such compounds include, but are not limited to, copper sulfate, copper nitrate, copper thiocyanate, disodium copper ethylenediaminetetraacetate tetrahydrate, copper bromide, copper oxide, copper hydroxide, copper chloride, copper fluoride, copper gluconate, copper citrate, copper lauroyl sarcosinate, copper lactate, copper oxalate, copper tartrate, copper malate, copper succinate, copper malonate, copper maleate, copper benzoate, copper salicylate, copper amino acid complexes, copper fumarate, copper glycerophosphate, sodium copper chlorophyllin, copper fluorosilicate, copper fluoroborate and copper iodate, as well as copper salts of carboxylic acids such as in the homologous series formic acid to decanoic acid, and copper salts of polybasic acids in the series oxalic acid to suberic acid.

When copper ions supplied from such a water-soluble copper compound are precipitated as an impurity in the form of copper sulfate, copper oxide, etc., it may be desirable to add a complexing agent that suppresses the precipitation of copper ions, thus stabilizing them as a copper complex in the composition.

According to the present invention, the copper compound may be added as a copper complex salt such as or Cu-EDTA, which can be present stably in the pretreatment composition on its own, but it is also possible to form a copper complex that can be present stably in the pretreatment composition by combining a complexing agent with a compound that is difficult to solubilize on its own. An example thereof includes a Cu-EDTA complex formed by a combination of $CuSO_4$ and EDTA.2Na.

According to the present invention, the electropositive metal ion may be present in the pretreatment composition in an amount of at least 2 ppm (calculated as metal ion), based on the total weight of the pretreatment composition, such as at least 4 ppm, such as at least 6 ppm, such as at least 8 ppm, such as at least 10 ppm. According to the present invention, the electropositive metal ion may be present in the pretreatment composition in an amount of no more than 100 ppm (calculated as metal ion), based on the total weight of the pretreatment composition, such as no more than 80 ppm, such as no more than 60 ppm, such as no more than 40 ppm, such as no more than 20 ppm. According to the present invention, the electropositive metal ion may be present in the pretreatment composition in an amount of from 2 ppm to 100 ppm (calculated as metal ion), based on the total weight of the pretreatment composition, such as from 4 ppm to 80 ppm, such as from 6 ppm to 60 ppm, such as from 8 ppm to 40 ppm. The amount of electropositive metal ion in the pretreatment composition can range between the recited values inclusive of the recited values.

According to the present invention, a source of fluoride may be present in the pretreatment composition. As used herein the amount of fluoride disclosed or reported in the pretreatment composition is referred to as "free fluoride," that is, fluoride present in the pretreatment composition that is not bound to metal ions or hydrogen ions, as measured in part per millions of fluoride. Free fluoride is defined herein as being able to be measured using, for example, an Orion Dual Star Dual Channel Benchtop Meter equipped with a fluoride ion selective electrode ("ISE") available from Thermoscientific, the Symphony® Fluoride Ion Selective Combination Electrode supplied by VWR International, or similar electrodes. See e.g., Light and Cappuccino, *Determination of fluoride in toothpaste using an ion-selective electrode*, J. Chem. Educ., 52:4, 247-250, April 1975. The fluoride ISE may be standardized by immersing the electrode into solutions of known fluoride concentration and recording the reading in millivolts, and then plotting these millivolt readings in a logarithmic graph. The millivolt reading of an unknown sample can then be compared to this calibration graph and the concentration of fluoride determined. Alternatively, the fluoride ISE can be used with a meter that will perform the calibration calculations internally and thus, after calibration, the concentration of the unknown sample can be read directly.

Fluoride ion is a small negative ion with a high charge density, so in aqueous solution it is frequently complexed with metal ions having a high positive charge density or with hydrogen ion. Fluoride anions in solution that are ionically or covalently bound to metal cations or hydrogen ion are defined herein as "bound fluoride." The fluoride ions thus complexed are not measurable with the fluoride ISE unless the solution they are present in is mixed with an ionic strength adjustment buffer (e.g., citrate anion or EDTA) that releases the fluoride ions from such complexes. At that point (all of) the fluoride ions are measurable by the fluoride ISE, and the measurement is known as "total fluoride". The sum of the concentrations of the bound and free fluoride equal the total fluoride, which can be determined as described herein.

The total fluoride in the pretreatment composition can be supplied by hydrofluoric acid, as well as alkali metal and ammonium fluorides or hydrogen fluorides. Additionally, total fluoride in the pretreatment composition may be derived from Group IVB metals present in the pretreatment composition, including, for example, hexafluorozirconic acid or hexafluorotitanic acid. Other complex fluorides, such as $H_2SiF_6$ or $HBF_4$, can be added to the pretreatment composition to supply total fluoride. The skilled artisan will understand that the presence of free fluoride in the pretreatment bath can impact pretreatment deposition and etching of the substrate, hence it is critical to measure this bath parameter. The levels of free fluoride will depend on the pH and the addition of chelators into the pretreatment bath and indicates the degree of fluoride association with the metal ions/protons present in the pretreatment bath. For example, pretreatment compositions of identical total fluoride levels can have different free fluoride levels which will be influenced by the pH and chelators present in the pretreatment solution.

According to the present invention, the free fluoride of the pretreatment composition may be present in an amount of at least 15 ppm, based on a total weight of the pretreatment composition, such as at least 50 ppm free fluoride, such as at least 100 ppm free fluoride, such as at least 200 ppm free fluoride. According to the present invention, the free fluoride of the pretreatment composition may be present in an amount of no more than 2500 ppm, based on a total weight of the pretreatment composition, such as no more than 1000 ppm free fluoride, such as no more than 500 ppm free fluoride, such as no more than 250 ppm free fluoride. According to the present invention, the free fluoride of the pretreatment composition may be present in an amount of 15 ppm free fluoride to 2500 ppm free fluoride, based on a total weight of the pretreatment composition, such as 50 ppm fluoride to 1000 ppm, such as no more than 200 ppm free fluoride to 500 ppm free fluoride, such as no more than 100 ppm free fluoride to 250 ppm free fluoride.

According to the present invention, the pretreatment composition may, in some instances, comprise an adhesion promoter. As used herein, the term "adhesion promoter" refers to a chemical species that has at least two binding sites (difunctional) to facilitate interaction (whether electrostatic, covalent, or adsorption) between the pretreated surface and subsequent coating layers or to enhance cohesive bonding within the pretreatment layer by co-depositing during the deposition of the pretreatment film. Non-limiting examples of the adhesion promoter include carboxylates, phosphonates, silanes, sulfonates, anhydrides, titanates, zirconates, unsaturated fatty acids, functionalized amines, phosphonic acids, functionalized thiols, carboxylic acids, polycarboxylic acid, bisphosphonic acids, poly(acrylic) acid, or combinations thereof. According to the present invention, the adhesion promoter may have a molecular weight of 200 to 20,000, such as 500 to 5000, such as 1000 to 3000. Commercially available products include, for example, Acumer 1510 (available from Dow), and Dispex Ultra 4585, 4580 and 4550 (available from BASF). According to the present invention, the adhesion promoter may be present in the pretreatment composition in an amount of 10 ppm to 10,000 ppm, such as 15 ppm to 1500 ppm, such as 20 ppm to 1000 ppm, such 25 to 500 ppm.

According to the present invention, the pretreatment composition may exclude chromium or chromium-containing compounds. As used herein, the term "chromium-containing compound" refers to materials that include trivalent and/or hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, strontium dichromate, chromium(III) sulfate, chromium(III) chloride, and chromium(III) nitrate. When a pretreatment composition and/or a coating or a layer, respectively, formed from the same is substantially free, essentially free, or completely free of chromium, this includes chromium in any form, such as, but not limited to, the trivalent and hexavalent chromium-containing compounds listed above.

Thus, optionally, according to the present invention, the present pretreatment compositions and/or coatings or layers, respectively, deposited from the same may be substantially free, may be essentially free, and/or may be completely free of one or more of any of the elements or compounds listed in the preceding paragraph. A pretreatment composition and/or coating or layer, respectively, formed from the same that is substantially free of chromium or derivatives thereof means that chromium or derivatives thereof are not intentionally added, but may be present in trace amounts, such as because of impurities or unavoidable contamination from the environment. In other words, the amount of material is so small that it does not affect the properties of the pretreatment composition; in the case of chromium, this may further include that the element or compounds thereof are not present in the pretreatment compositions and/or coatings or layers, respectively, formed from the same in such a level that it causes a burden on the environment. The term "substantially free" means that the pretreatment compositions and/or coating or layers, respectively, formed from the same contain less than 10 ppm of any or all of the elements or compounds listed in the preceding paragraph, based on total weight of the composition or the layer, respectively, if any at all. The term "essentially free" means that the pretreatment compositions and/or coatings or layers, respectively, formed from the same contain less than 1 ppm of any or all of the elements or compounds listed in the preceding paragraph, if any at all. The term "completely free" means that the pretreatment compositions and/or coatings or layers, respectively, formed from the same contain less than 1 ppb of any or all of the elements or compounds listed in the preceding paragraph, if any at all.

According to the present invention, the pretreatment composition may, in some instances, exclude phosphate ions or phosphate-containing compounds and/or the formation of sludge, such as aluminum phosphate, iron phosphate, and/or zinc phosphate, formed in the case of using a treating agent based on zinc phosphate. As used herein, "phosphate-containing compounds" include compounds containing the element phosphorous such as ortho phosphate, pyrophosphate, metaphosphate, tripolyphosphate, organophosphonates, and the like, and can include, but are not limited to, monovalent, divalent, or trivalent cations such as: sodium, potassium, calcium, zinc, nickel, manganese, aluminum and/or iron. When a composition and/or a layer or coating comprising the same is substantially free, essentially free, or completely free of phosphate, this includes phosphate ions or compounds containing phosphate in any form.

Thus, according to the present invention, pretreatment composition and/or layers deposited from the same may be substantially free, or in some cases may be essentially free, or in some cases may be completely free, of one or more of any of the ions or compounds listed in the preceding paragraph. A pretreatment composition and/or layers deposited from the same that is substantially free of phosphate means that phosphate ions or compounds containing phosphate are not intentionally added, but may be present in trace amounts, such as because of impurities or unavoidable contamination from the environment. In other words, the amount of material is so small that it does not affect the properties of the composition; this may further include that phosphate is not present in the pretreatment compositions and/or layers deposited from the same in such a level that they cause a burden on the environment. The term "substantially free" means that the pretreatment compositions and/or layers deposited from the same contain less than 5 ppm of any or all of the phosphate anions or compounds listed in the preceding paragraph, based on total weight of the composition or the layer, respectively, if any at all. The term "essentially free" means that the pretreatment compositions and/or layers comprising the same contain less than 1 ppm of any or all of the phosphate anions or compounds listed in the preceding paragraph. The term "completely free" means that the pretreatment compositions and/or layers comprising the same contain less than 1 ppb of any or all of the phosphate anions or compounds listed in the preceding paragraph, if any at all.

Optionally, according to the present invention, the pretreatment composition may further comprise a source of phosphate ions. For clarity, when used herein, "phosphate ions" refers to phosphate ions that derive from or originate from inorganic phosphate compounds. For example, in some instances, phosphate ions may be present in an amount of greater than 5 ppm, based on total weight of the pretreatment composition, such as 10 ppm, such as 20 ppm. In some instances, phosphate ions may be present in an amount of no more than 60 ppm, based on total weight of the pretreatment composition, such as no more than 40 ppm, such as no more than 30 ppm. In some instances, phosphate ions may be present in an amount of from 5 ppm to 60 ppm, based on total weight of the pretreatment composition, such as from 10 ppm to 40 ppm, such as from 20 ppm to 30 ppm.

According to the present invention, the pH of the pretreatment composition may be 6.5 or less, such as 6.0 or less, such as 5.5 or less, such as 4.0 or less, such as 3.0 or less. According to the present invention, the pH of the pretreatment composition may, in some instances, be 2.0 to 6.5, such as 3.0 to 6.0, such 4.0 to 5.5, and may be adjusted using, for example, any acid and/or base as is necessary. According to the present invention, the pH of the pretreatment composition may be maintained through the inclusion of an acidic material, including water soluble and/or water dispersible acids, such as nitric acid, sulfuric acid, and/or phosphoric acid. According to the present invention, the pH of the composition may be maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

According to the present invention, the pretreatment composition also may further comprise a resinous binder. Suitable resins include reaction products of one or more alkanolamines and an epoxy-functional material containing at least two epoxy groups, such as those disclosed in U.S. Pat. No. 5,653,823. In some cases, such resins contain beta hydroxy ester, imide, or sulfide functionality, incorporated by using dimethylolpropionic acid, phthalimide, or mercaptoglycerine as an additional reactant in the preparation of the resin. Alternatively, the reaction product can for instance be that of the diglycidyl ether of Bisphenol A (commercially available e.g. from Shell Chemical Company as EPON 880), dimethylol propionic acid, and diethanolamine in a 0.6 to 5.0:0.05 to 5.5:1 mole ratio. Other suitable resinous binders include water soluble and water dispersible polyacrylic acids such as those disclosed in U.S. Pat. Nos. 3,912,548 and 5,328,525; phenol formaldehyde resins such as those described in U.S. Pat. No. 5,662,746; water soluble polyamides such as those disclosed in WO 95/33869; copolymers of maleic or acrylic acid with allyl ether such as those described in Canadian Patent Application No. 2,087,352; and water soluble and dispersible resins including epoxy resins, aminoplasts, phenol-formaldehyde resins, tannins, and polyvinyl phenols such as those discussed in U.S. Pat. No. 5,449,415.

According to the present invention, the resinous binder often may be present in the pretreatment composition in an amount of 0.005 percent to 30 percent by weight, such as 0.5 to 3 percent by weight, based on the total weight of the composition. Alternatively, according to the present invention, the pretreatment composition may be substantially free or, in some cases, completely free of any resinous binder. As used herein, the term "substantially free", when used with reference to the absence of resinous binder in the pretreatment composition, means that, if present at all, any resinous binder is present in the pretreatment composition in a trace amount of less than 0.005 percent by weight, based on total weight of the composition. As used herein, the term "completely free" means that there is no resinous binder in the pretreatment composition at all.

The pretreatment composition may comprise an aqueous medium and may optionally contain other materials such as nonionic surfactants and auxiliaries conventionally used in the art of pretreatment compositions. In the aqueous medium, water dispersible organic solvents, for example, alcohols with up to about 8 carbon atoms such as methanol, isopropanol, and the like, may be present; or glycol ethers such as the monoalkyl ethers of ethylene glycol, diethylene glycol, or propylene glycol, and the like. When present, water dispersible organic solvents are typically used in amounts up to about ten percent by volume, based on the total volume of aqueous medium.

Other optional materials include surfactants that function as defoamers or substrate wetting agents. Anionic, cationic, amphoteric, and/or nonionic surfactants may be used. Defoaming surfactants may optionally be present at levels up to 1 weight percent, such as up to 0.1 percent by weight, and wetting agents are typically present at levels up to 2 percent, such as up to 0.5 percent by weight, based on the total weight of the pretreatment composition.

Optionally, according to the present invention, the pretreatment composition and/or films deposited or formed therefrom may further comprise silicon-containing compounds, such as silanes, silicas, silicates, and the like, in amounts of at least 10 ppm, based on total weight of the pretreatment composition, such as at least 20 ppm, such as at least 50 ppm. According to the present invention, the pretreatment composition and/or films deposited or formed therefrom may comprise silicon in amounts of less than 500 ppm, based on total weight of the pretreatment composition, such as less than 250 ppm, such as less than 100 ppm. According to the present invention, the pretreatment composition and/or films deposited or formed therefrom may comprise silicon in amounts of 10 ppm to 500 ppm, based on total weight of the pretreatment composition, such as 20 ppm to 250 ppm, such as 50 ppm to 100 ppm. Alternatively, the pretreatment composition of the present invention and/or films deposited or formed therefrom may be substantially free, or, in some cases, completely free of silicon.

The pretreatment composition may comprise a carrier, often an aqueous medium, so that the composition is in the form of a solution or dispersion of the Group IVB metal in the carrier. According to the present invention, the solution or dispersion may be brought into contact with the substrate by any of a variety of known techniques, such as dipping or immersion, spraying, intermittent spraying, dipping followed by spraying, spraying followed by dipping, brushing, or roll-coating. According to the invention, the solution or dispersion when applied to the metal substrate is at a temperature ranging from 40° F. to 185° F., such as 60° F. to 110° F., such as 70° F. to 90° F. For example, the pretreatment process may be carried out at ambient or room temperature. The contact time is often from 5 seconds to 15 minutes, such as 10 seconds to 10 minutes, such as 15 seconds to 3 minutes, such as 30 seconds to 2 minutes.

As discussed above, elevated nitrite levels in the pretreatment bath interfere with deposition of Group IVB metals on the metal substrate being treated in the pretreatment bath, thereby resulting in diminished corrosion protection. The methods of controlling nitrite levels in a pretreatment bath disclosed herein have been surprisingly found to avoid the drawbacks associated with elevated nitrite levels in the bath by providing a way of chemically controlling nitrite levels on the processing line, thereby avoiding the need for replacing or overflowing the baths.

In view of the foregoing description the present invention thus relates in particular, without being limited thereto, to the following Aspects 1-26:

Aspects

1. A system for maintaining a pretreatment bath, the system comprising: an aqueous reducing agent comprising a metal cation and a latent source of sulfate which, upon reaction with a contaminant in the pretreatment bath, forms a metal sulfate; wherein the contaminant comprises a nitrite source; and wherein the metal sulfate salt has a pKsp of 4.5 to 11 at a temperature of 25° C.

2. The system of Aspect 1, wherein the metal cation comprises a cation of calcium, strontium, barium, radium, lead(II), and/or silver(I).

3. The system of Aspect 1 or Aspect 2, the reducing agent further comprising an anion capable of forming a salt with the metal cation.

4. The system of Aspect 3, wherein the anion comprises a hydroxide, carbonate, or combinations thereof.

5. The system of any one of Aspects 1-4, wherein the reducing agent has a pH of less than 7.

6. The system of any one of Aspects 1-5, further comprising a pretreatment composition comprising a Group IVB metal.

7. The system of Aspect 6, wherein the Group IVB metal comprises zirconium.

8. The system of Aspect 6 or Aspect 7, wherein the pretreatment composition further comprises free fluoride, an electropositive metal, and/or a binder.

9. The system of any one of Aspects 1-8, further comprising a pH adjusting agent.

10. A substrate treated with a pretreatment bath maintained by the system of any one of Aspects 1-9.

11. The substrate of Aspect 10, wherein a film formed on a surface of the substrate has at least a 33% increase in zirconium coating weight compared to a film formed on a surface of a substrate treated with a pretreatment bath not maintained by the system of any one of Aspects 1-9.

12. A method for maintaining a pretreatment bath containing a pretreatment composition comprising a Group IVB metal, the method comprising: supplying an aqueous reducing agent to the pretreatment bath in an amount sufficient to reduce a pollution ratio of the pretreatment bath to less than 1:1; wherein the reducing agent comprises a metal cation and a latent source of sulfate which, upon reaction with a contaminant in the pretreatment bath, forms a metal sulfate; wherein the contaminant comprises a nitrite source; and wherein the metal sulfate salt has a pKsp of 4.5 to 11 at a temperature of 25° C.

13. The method of Aspect 12, wherein the metal cation comprises a cation of calcium, strontium, barium, radium, lead(II), and/or silver(I).

14. The method of Aspect 12 or Aspect 13, wherein the reducing agent further comprises an anion capable of forming a salt with the metal cation.

15. The method of Aspect 14, wherein the anion comprises a hydroxide, a carbonate, or combinations thereof.

16. The method of any one of Aspects 12-15, wherein the reducing agent has a pH of less than 7.

17. The method of any one of Aspects 12-16, further comprising supplying a pH adjusting agent to the pretreatment bath.

18. The method of any one of Aspects 12-17, wherein, prior to supplying the reducing agent, the pollution ratio of the pretreatment bath is greater than 1:1.

19. The method of any one Aspects 12-18, wherein the reducing agent is supplied to the pretreatment bath in an amount sufficient to cause the pretreatment bath to be substantially free of nitrite.

20. The method of any one of Aspects 12-19, wherein the reducing agent is supplied to the pretreatment bath in an amount sufficient to cause the pretreatment bath to be completely free of nitrite.

21. The method of any one of Aspects 12-20, wherein the supplying the reducing agent is performed off-shift.

22. The method of any one of Aspects 12-21, wherein the supplying the reducing agent is performed on-shift.

23. The method of any one of Aspects 12-22, wherein the reducing agent is a reducing agent as described in any one of Aspects 1-5 and/or the pretreatment bath comprises a pretreatment composition as described in any one of Aspect 6-8.

24. A substrate treated according to the method of any one of Aspects 12-23.

25. The substrate of Aspect 24, wherein a film formed on a surface of the substrate has at least 33% increase in zirconium coating weight compared to a film formed on a surface of a substrate not treated with the method of any one of Aspects 12-23.

26. Use of a reducing agent as described in any one of Aspects 1-5 for maintaining a pretreatment bath as described in any one of Aspects 6-8.

Illustrating the invention are the following examples that are not to be considered as limiting the invention to their details. All parts and percentages in the examples, as well as throughout the specification, are by weight unless otherwise indicated.

EXAMPLES

In all of the Examples described herein, the amount of nitrite in solution was measured using a fermentation tube using the protocol described in the technical data sheet for Chemfos Liquid Additive (available from PPG Industries, Inc., Cleveland, Ohio). In each Example below, a fermentation tube was filled with a 70 mL sample of the pretreatment bath to just below the mouth of the tube. Two (2.0) g of sulfamic acid was added to the tube, and the tube was inverted to mix the sulfamic acid and pretreatment solution. Gas evolution occurred, which displaced the liquid in the top of the fermentation tube, and the level was read and recorded. The level corresponded to the gas points measured in the solution in milliliters.

TABLE 5

Calculation of Pollution Ratios of Pretreatment Bath

| Gas Points (mL) | Total Amount of NaNO$_2$ Added (g) | Concentration Nitrite (ppm) determined by IC | Milli-molar Concentration Nitrite (mmol/L) | Zirconium (Zr) Concentration (Ppm) | Milli-molar Concentration of Zr (mmol/L) | Pollution Ratio— mmolar ratio |
|---|---|---|---|---|---|---|
| 0.0 | 0.0 | <1.0 | 0.02 | 200 | 2.2 | <0.01:1.0 |
| 3.0 | 2.0 | 84 | 1.8 | 200 | 2.2 | 0.82:1.0 |
| 7.0 | 4.67 | 196 | 4.3 | 200 | 2.2 | 2.0:1.0 |
| 10.0 | 6.67 | 281 | 6.1 | 200 | 2.2 | 2.8:1.0 |

Example 1

Cold rolled steel test panels (105 mm×190 mm) were obtained from Chemetall (Gardobond MBS 21; Frankfurt, Germany) (referred to herein as "Steel C"). These panels were cut to 4"×6" prior to cleaning and pretreatment for all of the following examples.

A 10-gallon cleaner composition bath was prepared in deionized water at 1.25% v/v concentration of Chemkleen 2010LP (a phosphate-free alkaline cleaner available from PPG Industries, Inc.) and 0.125% of Chemkleen 181 ALP (a phosphate-free blended surfactant additive, available from PPG).

Pretreatment composition A was prepared by adding 11.0 g fluorozirconic acid (45 wt. % in water) (available from Honeywell International, Inc. (Morristown, N.J.)), 12.0 g Chemfos AFL (a partially neutralized aqueous ammonium bifluoride solution, commercially available from PPG Industries, Inc.), and 22.1 g copper nitrate solution (2 wt. % Cu solution, which was prepared by dilution of a copper nitrate solution (18 wt. % Cu in water) available from Shepherd Chemical Company (Cincinnati, Ohio)). The pH of the bath was measured using a Thermo Scientific Orion Dual Star pH/ISE Bench Top Reader attached to an Accumet Cat #13-620-221 pH probe and was adjusted to 4.7 with Chemfil buffer (an alkaline buffer commercially available from PPG Industries, Inc.).

Pretreatment Bath A contained 200 ppm zirconium (calculated), 38 ppm copper (calculated), and 110 ppm free fluoride (measured using an Orion Dual Star Dual Channel Benchtop Meter equipped with a fluoride ion selective electrode ("ISE") available from Thermoscientific, the Symphony® Fluoride Ion Selective Combination Electrode supplied by VWR International). Nitrite concentration in Pretreatment Bath A was measured as described above. No gas points were detected in the fermentation tube, indicating that the concentration of nitrite in solution was less than 1 ppm. The pollution ratio in Pretreatment Bath A was 0.01:1.0 (see Table 5).

One panel of Steel C was cleaned/degreased by immersion in the bath containing the cleaner composition described above (heated to 48.9° C. or 125° F.) for 2 minutes, followed by spray rinse with deionized water for 30 seconds using a Melnor Rear-Trigger 7-Pattern nozzle set to shower mode (available from Home Depot).

Next, the panel was immersed in Pretreatment Bath A (ambient temperature (27° C. or 80° F.)) for 2 minutes, followed by spray rinse with deionized water for 30 seconds as described above. Panels were warm air dried using a Hi-Velocity handheld blow-dryer made by Oster® (model number 078302-300-000) on high-setting at a temperature of 50-55° C. (122° F. to 131° F.) until dry (1-5 minutes).

The weight percentage of zirconium and copper in an untreated panel of Steel C and in the film formed on the substrate surface following immersion in Pretreatment Bath A was measured using an Axios Max-Advance X-Ray Fluorescence (XRF) spectrophotometer (PANanytical, Almelo, the Netherlands). Table 6 shows the weight percentages of zirconium and copper on an untreated panel of Steel C and in the panel that was immersed in Pretreatment Bath A. Both zirconium and copper were deposited on the surface of the panel of Steel C immersed in Pretreatment Bath A.

Example 2

In order to form a bath containing elevated levels of nitrite (such as may occur on-line when substrates are run through the baths containing pretreatment compositions), Pretreatment Bath B was made by adding 2.0 g sodium nitrite (Fisher Scientific International, Inc., Hampton, N.H.) to Pretreatment Bath A (whole volume). The pH of Pretreatment Bath B was measured as described in Example 1 and was adjusted to 4.7 with nitric acid (Fisher Scientific International, Inc.).

Pretreatment Bath B contained 200 ppm zirconium (calculated), 38 ppm copper (calculated), and 110 ppm free fluoride (measured as described in Example 1). The gas points of Pretreatment Bath B were measured to be 3.0 with a fermentation tube using the technique described in above. The concentration of nitrite in solution was 84 ppm. The pollution ratio was 0.82:1.0 (see Table 5).

One panel of Steel C panel was cleaned/degreased as described in Example 1. The panel then was immersed in Pretreatment Bath B at ambient temperature (27° C. or 80° F.) for 2 minutes, and then was rinsed and dried as described in Example 1.

The weight percentage of zirconium and copper in the film formed on the substrate following immersion in Pretreatment Bath B was measured as described in Example 1. As shown in Table 6, the weight % of zirconium deposited on the surface of a panel of Steel C immersed in Pretreatment Bath B was reduced by 32% compared to a panel immersed in Pretreatment Bath A. These data demonstrate that the presence of nitrite in the pretreatment bath impairs deposition of zirconium on Steel C. That is, as the pollution ratio increased, the deposition of zirconium on the substrate surface decreased.

Example 3

In order to form a bath containing elevated levels as nitrite (such as may occur on-line when substrates are run through the baths containing pretreatment compositions), Pretreatment Bath C was made by adding an additional 2.67 g sodium nitrite (Fisher Scientific International, Inc., Hampton, N.H.) to Pretreatment Bath B (yielding a total of 4.67 g sodium nitrite). The pH of Pretreatment Bath B was measured as described in Example 1 and was adjusted to 4.7 with nitric acid (Fisher Scientific International, Inc.).

Pretreatment Bath C contained 200 ppm zirconium (calculated), 38 ppm copper (calculated), and 108 ppm free fluoride (measured as described in Example 1). The gas points of Pretreatment Bath C were measured to be 7.0 with a fermentation tube using the technique described in above. The concentration of nitrite in solution was 196 ppm. The pollution ratio was 2.0:1.0.

A panel of Steel C was cleaned/degreased as described in Example 1. The panel then was immersed in Pretreatment Bath C (ambient temperature (27° C.) for 2 minutes, and then was rinsed and dried as described in Example 1.

The weight percentage of zirconium and copper in the film formed on the substrate following immersion in Pretreatment Bath C was measured as described in Example 1. As shown in Table 6, the weight % of zirconium deposited on the surface of the panel of Steel C immersed in Pretreatment Bath C was reduced by 98% compared to the panel immersed in Pretreatment Bath A. The weight percent of copper in the film formed on the substrate surface following immersion in Pretreatment Bath C was reduced by 24%.

These data demonstrate that the presence of increased levels of nitrite compared to zirconium in Pretreatment Bath B even further impairs deposition of zirconium and reduced deposition of copper on Steel C. That is, as the pollution ratio increased, the deposition of zirconium and copper on the substrate surface decreased.

Example 4

In order to form a bath containing elevated levels as nitrite (such as may occur on-line when substrates are run through the baths containing pretreatment compositions), Pretreatment Bath D was made by adding an additional 2.0 g sodium nitrite (Fisher Scientific International, Inc., Hampton, N.H.) to Pretreatment Bath C (yielding a total 6.67 g sodium nitrite). The pH of Pretreatment Bath D was measured as described in Example 1 and was adjusted to 4.7 with nitric acid (Fisher Scientific International, Inc.).

Pretreatment Bath D contained 200 ppm zirconium (calculated), 38 ppm copper (calculated), and 110 ppm free fluoride (measured as described in Example 1). The gas points of Pretreatment Bath B were measured to be 10.0 with a fermentation tube using the technique described in above. The concentration of nitrite in solution was 281 ppm. The pollution ratio was 2.8:1.0 (see Table 5).

One panel of Steel C was cleaned/degreased as described in Example 1. The panel then was immersed in Pretreatment Bath C at ambient temperature (27° C. or 80° F.) for 2 minutes, and then was rinsed and dried as described in Example 1.

The weight percentage of zirconium and copper in the film formed on the substrate following immersion in Pretreatment Bath D was measured as described in Example 1. As shown in Table 6, the weight % of zirconium deposited on the surface of the panel of Steel C immersed in Pretreatment Bath D was reduced by 98% compared to the panel immersed in Pretreatment Bath A. The weight percent of copper in the film formed on the substrate surface following immersion in Pretreatment Bath D was reduced by 75%. These data demonstrate that the presence of increased levels of nitrite compared to nitrate in Pretreatment Bath D even further impairs deposition of zirconium and copper on Steel C.

Example 5

In order to remove nitrite from Pretreatment Bath D, Pretreatment Bath E was made by adding a solution of barium sulfamate (prepared by adding 30.6 g barium hydroxide octohydrate (Fisher Scientific International, Inc.) and 11.3 g sulfamic acid (from Univar, Redmond, Wash.) to 200 mL deionized water) to Pretreatment Bath D. The pH of Pretreatment Bath E (measured as described in Example 1) dropped to 2.6 within 5 minutes of the addition of the barium sulfamate solution. Pretreatment Bath E was allowed to circulate for 1 hour at room temperature (26.7° C., 80° F.) using an immersion heater (Polyscience Sous Vide Professional, Model #7306AC1B5, available from Polyscience, Niles, Ill.) set to high agitation mode. Following the addition of the barium sulfamate solution, gas evolved and copious amounts of an off-white precipitate formed, which was analyzed by inductively coupled plasma (ICP) analysis and confirmed to be barium sulfate. Specifically, ICP analysis found that there was less than 2 ppm soluble barium in Bath E. The solid material contained 111 ppm insoluble barium and 20 ppm sulfur, which corresponds to the molecular composition of barium sulfate. The pH of Pretreatment Bath E again was measured as described in Example 1 and was adjusted to 4.7 with nitric acid (Fisher Scientific International, Inc.).

Pretreatment Bath E contained 197 ppm zirconium (calculated), 38 ppm copper (calculated), and 110 ppm free fluoride (measured as described in Example 1). The gas points of Pretreatment Bath E were measured to be 0.0 with a fermentation tube using the technique described in above, which confirmed that all of the nitrite was consumed by the addition of barium sulfamate. Ion chromatography (IC) analysis found that there was less than 1 ppm nitrite in solution Bath E. The pollution ratio of Bath E was less than 0.1:1.0. No evidence of barium incorporation into the film was observed by XRF.

One panel of Steel C was cleaned/degreased as described in Example 1. The panel then was immersed in Pretreatment Bath E (ambient temperature (27° C.) for 2 minutes, and then was rinsed and dried as described in Example 1.

The weight percentage of zirconium and copper in the film formed on the substrate following immersion in Pretreatment Bath E was measured as described in Example 1. As shown in Table 6, the weight % of zirconium deposited on the surface of the panel of Steel C immersed in Pretreatment Bath E was partially restored, with only a 10% reduction compared to the panel immersed in Pretreatment A, and compared to a 98% reduction seen in Pretreatment Bath D (i.e., prior to addition of barium sulfamate to the bath). Furthermore, as shown in Table 6, the weight % of copper deposited on the surface of the panel of Steel C immersed in Pretreatment Bath E was partially restored, with only a 20% reduction, compared to the panel immersed in Pretreatment A, and compared to 75% reduction seen in Pretreatment Bath D (i.e., prior to addition of barium sulfamate to the bath). These data demonstrate that the consumption of nitrite (i.e., reduction of the pollution ratio) by barium sulfamate at least partially restored deposition of zirconium and copper onto substrate surfaces.

TABLE 6

XRF Measurements of comparative (untreated panels) and panels of Steel C treated in Pretreatment Baths A-E

| Pretreatment Example/Bath | Zirconium (weight %) | Copper (weight %) | % Change in Zirconium deposition relative to weight % formed in Bath A | % Change in Copper deposition relative to weight % formed in Bath A |
| --- | --- | --- | --- | --- |
| 1/Untreated | Not detected | 0.022 weight % | NA | NA |
| 1/A | 0.94 weight % | 8.5 weight % | NA | NA |
| 2/B | 0.64 weight % | 8.6 weight % | −32% | +1% |
| 3/C | 0.023 weight % | 6.4 weight % | −98% | −24% |
| 4/D | 0.015 weight % | 2.1 weight % | −98% | −75% |
| 5/E | 0.85 weight % | 6.8 weight % | −10% | −20% |

Example 6

Pretreatment composition F was prepared by adding 11.0 g fluorozirconic acid (45 wt. % in water) (available from Honeywell International, Inc. (Morristown, N.J.)), 12.0 g Chemfos AFL (commercially available from PPG Industries, Inc.), and 22.1 g copper nitrate solution (2 wt. % Cu solution, which was prepared by dilution of a copper nitrate solution (18 wt. % Cu in water) available from Shepherd Chemical Company (Cincinnati, Ohio)), and 6.7 g sodium nitrite (Fisher Scientific International, Inc.) to 11.4 L deionized water. The pH of the bath was measured and adjusted to 4.7 as described in Example 1.

Pretreatment Bath F contained 200 ppm zirconium (calculated), 36 ppm copper (calculated), and 108 ppm free fluoride (measured using an Orion Dual Star Dual Channel Benchtop Meter equipped with a fluoride ion selective electrode ("ISE") available from Thermoscientific, the Symphony® Fluoride Ion Selective Combination Electrode supplied by VWR International). Gas point in Pretreatment Bath F was measured (as described above) to be 10.0. Pretreatment Bath F contained 281 ppm nitrite. The pollution ratio of Pretreatment Bath F was 2.8:1.0.

One panel of Steel C was cleaned/degreased as described in Example 1, then was immersed in Pretreatment Bath F at ambient temperature (27° C. or 80° F.) for 2 minutes, and then was rinsed and dried as described in Example 1.

The weight percentage of zirconium and copper in the film formed on the substrate following immersion in Pretreatment Bath F was measured as described in Example 1. As shown in Table 7, the weight % of zirconium deposited on the surface of the panel of Steel C immersed in Pretreatment Bath F was 0.014% by weight. The weight % of copper in the film formed on the surface of the panel of Steel C immersed in Pretreatment Bath F was 4.7% by weight.

Example 7

In order to remove nitrite from Pretreatment Bath F, Pretreatment Bath G was made by adding a strontium sulfamate solution (prepared by adding 25.4 g strontium hydroxide octohydrate (Fisher Scientific International, Inc.) and 11.3 g sulfamic acid (Univar, Redmond, Wash.) to 200 mL deionized water) to Pretreatment Bath F. The pH of Pretreatment Bath G (measured as described in Example 1) dropped to 2.6 following addition of the strontium sulfamate solution. Pretreatment Bath G was allowed to circulate for 1 hour at room temperature (26.7° C., 80° F.) using an immersion heater (Polyscience Sous Vide Professional, Model #7306AC1B5, available from Polyscience, Niles, Ill.) set to high agitation mode. Following the addition of the strontium sulfamate solution, gas evolved and a small amount of fluffy white precipitate formed. Following the 1-hour circulation of the bath, the pH was measured as described in Example 1 and adjusted to 4.7 with Chemfil buffer (PPG Industries, Inc.).

Pretreatment Bath G contained 160 ppm zirconium (calculated), 38 ppm copper (calculated), and 100 ppm free fluoride (measured as described in Example 1). The zirconium concentration and free fluoride concentrations were adjusted to 200 ppm and 108 ppm, respectively, by adding fluorozirconic acid and Chemfos AFL (PPG Industries, Inc.) to the bath. IC analysis found that there was less than 1 ppm nitrite in solution Bath F. The pollution ratio in Pretreatment Bath G was less than 0.01:1.0. No evidence of strontium incorporation into the film was observed by XRF.

One panel of Steel C was cleaned/degreased as described in Example 1, then was immersed in Pretreatment Bath G (ambient temperature (27° C. or 80° F.) for 2 minutes, and then was rinsed and dried as described in Example 1.

The weight percentage of zirconium and copper in the film formed on the substrate following immersion in Pretreatment Bath G was measured as described in Example 1. As shown in Table 7, the weight % of zirconium deposited on the surface of the panel of Steel C immersed in Pretreatment Bath G was partially restored, with only a 10% reduction compared to panels immersed in Pretreatment A and compared to 98% reduction seen in Pretreatment Bath F (i.e., prior to addition of strontium sulfamate to the bath). Furthermore, as shown in Table 7, the weight % of copper deposited on the surface of the panel of Steel C immersed in Pretreatment Bath G was partially restored. These data demonstrate that the consumption of nitrite by strontium sulfamate restored deposition of zirconium and copper onto the surface of Steel C.

TABLE 7

XRF Measurements of panels of Steel C treated in Pretreatment Baths F and G

| Pretreatment Example/Bath | Zirconium (weight %) | Copper (weight %) | % Change in Zirconium deposition relative to weight % formed in Bath A | % Change in Copper deposition relative to weight % formed in Bath A |
|---|---|---|---|---|
| 1/A | 0.94 weight % | 8.5 weight % | NA | NA |
| 6/F | 0.014 weight % | 4.7 weight % | −99% | −45% |
| 6/G | 0.86 weight % | 8.0 weight % | −9% | −6% |

Example 8

Pretreatment baths were prepared as described above, except on a 5-gallon scale (see Table 8). Following addition of sulfamate source to Pretreatment Baths F and G, the Baths were stirred for one hour as described above, at which time bath parameters were measured and determined to be returned to normal operating parameters (pH 4.7, 200 ppm Zr, 35 ppm Cu, 100 ppm free fluoride). Panels were treated as described above and were run in quadruplicate.

TABLE 8

Pretreatment Conditions (Example 8)

| Condition | Zr (ppm) | Cu (ppm) | pH | Free Fluoride (ppm) | Initial Gas Points (mL) | Reducing Agent | Final Pollution Ratio |
|---|---|---|---|---|---|---|---|
| A | 200 | 35 | 4.7 | 100 | 0.0 | None | <0.01:1.0 |
| B | 200 | 35 | 4.7 | 100 | 3.0 | None | 0.82:1.0 |
| C | 200 | 35 | 4.7 | 100 | 7.0 | None | 2.0:1.0 |
| D | 200 | 35 | 4.7 | 100 | 10.0 | None | 2.8:1.0 |
| E | — | — | — | — | — | — | — |
| F | 200 | 35 | 4.7 | 100 | 10.0 | Strontium Sulfamate | <0.01:1.0 |
| G | 200 | 35 | 4.7 | 100 | 10.0 | Barium Sulfamate | <0.01:1.0 |

After drying, the panels were electrocoated with ED7000Z electrocoat, available from PPG. The electrocoat was applied to target a 0.60 mil thickness. The rectifier (Xantrex Model XFR600-2) was set to the "Coulomb Controlled" setting. The conditions were set with 24 Coulombs and 180V with a ramp time of 30 s. The electrocoat was maintained at 90° F., with a stir speed of 340 rpms. After the electrocoat was applied, the panels were baked in an oven (Despatch Model LFD-1-42) at 177° C. (350° F.) for 25 minutes. The coating thickness was measured using a film thickness gauge (Fischer Technology Inc. Model FMP40C).

Electrocoated panels were scribed with a 10.2 cm vertical line in the middle of the panel down to the metal substrate. Panels also were tested for scribe creep blistering using GM cyclic corrosion test GMW14872 for 25 days. At the end of 25 days, panels were removed and allowed to dry until no surface water was visible (about 1 hour at 25° C.). Poorly adhered paint was removed using Scotch 898 filament tape (commercially available from 3M). Scribe creep (rusted, darkened areas or exposed metallic substrate where the coating lifted from the surface) was measured from affected paint to affected paint to the left and right of the scribe was measured at each cm along the scribe creating a total of 10 points of measurement. From this the average of the panels was used to calculate the average scribe creep reported in Table 9 below. The measurements were made by the use of a Fowler Sylvac digital caliper Model S 235.

TABLE 9

Corrosion performance

| Pretreatment Example/Bath | Average Scribe Creep (mm) | Standard Deviation |
|---|---|---|
| 8/A | 4.0 | 0.2 |
| 8/B | 4.0 | 0.5 |
| 8/C | 12.4[1] | 0.7 |
| 8/D | 15.8[2] | 1.9 |
| 8/E | 15.1[3] | 4.1 |
| 8/F | 5.4 | 1.1 |
| 8/G | 4.0 | 0.3 |

[1]Severe delamination.
[2]Significant edge corrosion and severe face blistering
[3]Significant edge corrosion.

The data in Table 9 demonstrate that elevated levels of nitrite (i.e., increased pollution ratio) in a bath containing a zirconium-based pretreatment composition negatively affects corrosion performance on Steel C. Addition of alkali metal sulfamates chemically reduced nitrite levels in the pretreatment bath (i.e., reduced the pollution ratio) and restored zirconium deposition and corrosion performance.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications which are within the spirit and scope of the disclosed methods, as defined by the appended claims.

We claim:

1. A method for maintaining a pretreatment bath containing a pretreatment composition comprising a Group IVB metal, the method comprising:
   supplying an aqueous reducing agent to the pretreatment bath in an amount sufficient to reduce a pollution ratio of the pretreatment bath to less than 1:1;
   wherein the reducing agent comprises a metal cation and a latent source of sulfate which, upon reaction with a contaminant in the pretreatment bath, forms a metal sulfate;
   wherein the contaminant comprises a nitrite source; and
   wherein the metal sulfate salt has a pKsp of 4.5 to 11 at a temperature of 25° C.

2. The method of claim 1, wherein the metal cation comprises a cation of calcium, strontium, barium, radium, lead(II), and/or silver(I).

3. The method of claim 1, wherein the reducing agent further comprises an anion capable of forming a salt with the metal cation.

4. The method of claim 3, wherein the anion comprises a hydroxide, a carbonate, or combinations thereof.

5. The method of claim 1, wherein the reducing agent has a pH of less than 7.

6. The method of claim 1, further comprising supplying a pH adjusting agent to the pretreatment bath.

7. The method of claim 1, wherein, prior to supplying the reducing agent, the pollution ratio of the pretreatment bath is greater than 1:1.

8. The method of claim 1, wherein the reducing agent is supplied to the pretreatment bath in an amount sufficient to cause the pretreatment bath to be substantially free of nitrite.

9. The method of claim 1, wherein the reducing agent is supplied to the pretreatment bath in an amount sufficient to cause the pretreatment bath to be completely free of nitrite.

10. The method of claim 1, wherein the supplying the reducing agent is performed off-shift.

11. The method of claim 1, wherein the supplying the reducing agent is performed on-shift.

* * * * *